US006362611B1

United States Patent
Utsunomiya

(10) Patent No.: US 6,362,611 B1
(45) Date of Patent: Mar. 26, 2002

(54) ELECTRONIC PORTABLE APPLIANCE

(75) Inventor: Fumiyasu Utsunomiya, Chiba (JP)

(73) Assignees: Seiko Instruments Inc.; Seiko Instruments R&D Center Inc., both of (JP)

( * ) Notice: Subject to any disclaimer, the term of this patent is extended or adjusted under 35 U.S.C. 154(b) by 0 days.

(21) Appl. No.: 09/421,595

(22) Filed: Oct. 20, 1999

(51) Int. Cl.$^7$ ................................................. G05F 1/40
(52) U.S. Cl. ........................................................ 323/282
(58) Field of Search ................................ 323/266, 268, 323/271, 273, 275, 282, 285

(56) References Cited

U.S. PATENT DOCUMENTS 5,675,240 A * 10/1997 Fujisawa et al. ............ 323/282
5,894,216 A * 4/1999 Cohen ......................... 323/284
6,163,141 A * 12/2000 Yoshida et al. .............. 323/266

* cited by examiner

Primary Examiner—Matthew Nguyen
(74) Attorney, Agent, or Firm—Adams & Wilks

(57) ABSTRACT

An electronic portable appliance is provided which can operate over a long time by enhancing charging efficiency of the electronic portable appliance driven on generation power and reducing useless current consumed by those other than a drive circuit, or can operate over an equivalent drive time to the conventional even where feed power is reduced by reducing the size and weight of a power feed means configured by a power generating means, booster circuit, etc. in order to reduce the size and weight of the electronic portable appliance. The electronic portable appliance is configured by a power feed means to supply power, a power storing means to store the power of the power feed means, a drive circuit to drive on power stored on the power of the power feed means or power stored on the power storing means, a switch means provided on a charge path to charge the power of the power feed means to the power storing means, and a control circuit for comparing between voltages on the charging path at a forward and rear of the switch means to turn on the switch means to charge the power of the power feed means to the power storing means when detecting that the voltage at the forward of the switch means on the charging path is higher and to turn off the switch means to prevent the stored power from reversely flowing from the power storing means to the power feed means when detecting that the voltage at the forward of the switch means on the charging path is lower.

20 Claims, 6 Drawing Sheets

ELECTRONIC PORTABLE APPLIANCE

BACKGROUND OF THE INVENTION

The present invention relates to electronic portable appliances to be driven on generation power of a power generating means or the like and, more particularly, to an electronic portable appliance provided with a power feed means having a power generating means or a generating means and booster circuit to increase the voltage of the power generating means, a power storing means to store power supplied by the power feed means, and a drive circuit driven on power supplied by the power feed means or on storage power of the power storing means, for use in a wrist watch driven on power supplied from a thermoelectric conversion device, solar battery or the like.

There is shown in FIG. 6 a schematic block diagram of an electronic portable appliance according to a related art. In FIG. 6, an electronic portable appliance 600 is configured by a power feed means 10 for supplying electric power, a power storing means 40 for storing power supplied by the power feed means 10 through a diode element 601, and a drive circuit 50 to be driven on power supplied by the power feed means 10 through the same diode 601 or on storage power built up on the power storing means 40. Furthermore, the power feed means 10 is formed by a power generating means, a booster circuit for increasing the voltage of the power generating means and so on.

In such an electronic portable appliance, the power feed means 10 is also required to be reduced in size and weight due to the reductions of size and weight of the appliance. Due to this, there is a tendency toward decreasing the power supplied by the power feed means 10. On the other hand, there is a desire to improve the charge efficiency to the power storing means 40 and effectively utilize the power stored on the storage means 50, due to a desire for increasing the operating time of the electronic portable appliance.

Accordingly, to realize the further reduction in size and weight or further increase in operation time for the electronic portable appliance, it is indispensable to further increase the charge efficiency to the power storing means and effectively utilize the storage power on the power storing means.

In the related art electronic portable appliance, rectification is made by the diode element 601 in order to prevent the stored power from reversely flowing in the event that the generation power runs out. However, the major cause of lowering the charge efficiency lies in loss due to a forward voltage drop across the diode element 601. Accordingly, the use of a diode element with a low forward voltage drop improves the charge efficiency. Meanwhile, the major cause of preventing effective utilization of the power stored on the power storing means 40 is current loss due to reverse current through the diode element 601. That is, it is satisfactory to use such a diode element that is low in forward voltage drop but less in reverse current. However, for the diode element, decrease in forward voltage drop and reduction in reverse current are in relationship of trade off. That is, there has been a problem that it is impossible to realize an electronic portable appliance smaller in size and lighter in weight and operable over a longer time so long as a diode element is used in the above-stated portion.

SUMMARY OF THE INVENTION

It is therefore an object of the present invention to provide an electronic portable appliance which is improved in charge efficiency but reduced in useless power such as reverse current, in order to realize reduction of size and weight and longer time operation of the apparatus.

An electronic portable appliance of the present invention to be driven on generation power is configured by a power feed means formed by only a power generating means or a combination of a power generating means and a booster means, a power storing means for storing power of the power feed means, a drive circuit to be operated on power of the power feed means or power stored on the power storing means, a switch means provided on a charging path for charging power of the power feed means to the power storing means to have a function of flowing a charge current and cutting off a reverse current and a feature of having a resistor component to produce a potential difference in the event a current flow, a voltage comparator circuit for comparing voltages on between a charging path point forward of the switch means and a charging path point backward of the switch means, and a control circuit for controlling the switch means depending on a result of comparison by the voltage comparator circuit.

As discussed before, the resistance component possessed by the switch means produces a potential difference at respective ends of the switch means during charging or current reverse flow. It therefore possible for the voltage comparator circuit in the control circuit to perform stable voltage comparison. Thus, realized is a control circuit capable of stably controlling the switch means.

Accordingly, the switch means and control circuit can realize an equivalent function to the diode element used in the conventional electronic portable appliance. In the case of large charge current, the switch means decreases the efficiency of charging to a degree corresponding to the resistance component due to voltage drop through the resistance component. Where the charge current is low, there is almost no decrease of charge current due to voltage drop through the resistance component. Moreover, reverse current is suppressed extremely low. Accordingly, where only a certain degree of charge current occurs, it is possible to improve the charge efficiency and decrease the reverse current.

Furthermore, the invention in the above configuration is structured that the resistance component of the switch means is reduced in resistance value as low as possible. Instead, a resistor element is provided in series with the switch means so that a potential difference is produced during charging or reverse current flow by the resistor element.

Due to this, it is possible to set to produce an optimal potential difference upon charging or reverse current flow, by changing the resistance element in accordance with the ability of the power feed means. Accordingly, labor and time can be omitted in designing an especial switch means having a resistance component with a resistance value meeting the ability of the power feed means or searching for a switch-means having a close resistance component to the resistance value.

Furthermore, the invention in the above configuration is structured that a diode element is provided in series with the switch means in place of using the resistor element wherein the diode has a lower forward voltage drop than that of the diode used in the conventional electronic portable appliance.

Due to this, the diode element, in place of the resistor element, can produce a potential difference during charging or reverse current flow. Thus, realized is a control circuit to stably control the switch means, as discussed above. Moreover, the usability of a lower forward voltage drop of a diode element than that of the diode element used in the conventional electronic portable appliance improves the charging efficiency. Moreover, the switch element can cut off reverse current, hence reducing the reverse current. Furthermore, for large charge current the diode element is lower in voltage drop in a charging direction as compared to the resistor element. In such a case, the charging efficiency increases as compared to the structure using the resistor element.

Furthermore, in the above structure, a resistance element is connected in parallel wit h the diode element.

This makes possible charging through the resistor element for low charge current and through the diode element for high charge current, thus enhancing the charging efficiency regardless of the amount of charge current.

Furthermore, the switch means uses a MOS transistor. The MOS transistor is less in turning on/off power and correspondingly reduced in useless power consumption. Furthermore, the switch means can be minimized, resulting in reduction in size and weight for the e electronic portable appliance.

Furthermore, the control circuit is provided with a function to intermittently operate the incorporated voltage comparator circuit and a memory circuit to memorize a last-time voltage comparison result of the voltage comparator circuit until a next operation of the voltage comparator circuit so that the switch means is controlled by the voltage comparison result memorized in the memory circuit. This allows the control circuit to operate with reduced power consumption, correspondingly reducing useless power.

Furthermore, the drive circuit has an oscillation circuit or frequency dividing circuit so that an intermittent pulse is created based on an output of the oscillation circuit or frequency dividing circuit which is required to intermittently operate the voltage comparator circuit of the control circuit. This eliminates the necessity for the control circuit to have an oscillation circuit or frequency dividing circuit to create an intermittent pulse, correspondingly reducing power consumption in the control circuit and hence reducing useless power as stated above.

Furthermore, the power feed means has a power generating means, an oscillation circuit and a booster circuit to increase the electromotive force voltage of the power generating means by utilizing an output signal of the oscillation circuit so that an intermittent pulse is created based on an output signal of the oscillation circuit to intermittently operate the voltage comparator circuit of the control circuit. Due to this, the control circuit does not require an oscillation circuit conventionally required to create an intermittent pulse, correspondingly reducing current consumption of the control circuit and hence useless power.

DETAILED DESCRIPTION OF THE PREFERRED EMBODIMENTS

Figure 1:
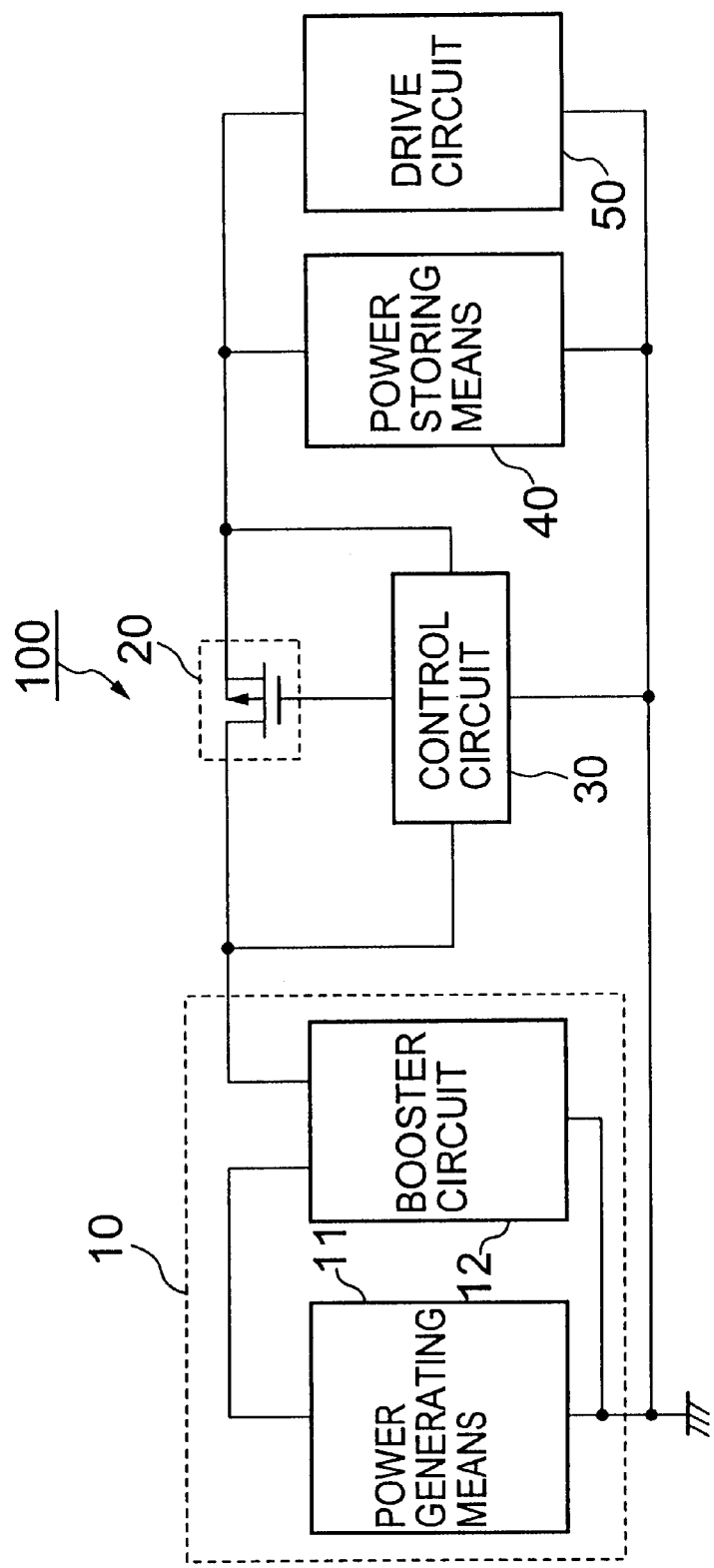
FIG. 1 is a schematic block diagram of an electronic portable appliance showing Embodiment 1 of the present invention.

Now an electronic portable appliance according to the present invention will be described with reference tow the drawings. FIG. 1 is a schematic block diagram of an electronic portable appliance according to Embodiment 1 of the invention. As shown in FIG. 1, an electronic portable appliance 100 driven on generation power comprises a power feed means 10 having a power generating means 11 and a booster circuit 12, a switch means 20, a control circuit 30, a power storing means 40 and a drive circuit 50.

The power feed means 10 does not necessarily require the booster circuit 12 provided that the power generating means 11 can generate an electromotive force higher than an operation voltage of drive circuit 50 during most part of power generation. However, if not so the booster circuit 12 has to be provided. It is noted that the power generating means may be any of a scheme utilizing a coil self-induction, a solar battery cell, a thermoelectric conversion device and piezoelectric effect, or a combination of these power generating schemes. Meanwhile, the booster circuit may be any of a switched capacitor scheme, a charge pump scheme, a scheme of rectifying and outputting alternating current amplified by a transformer and a scheme of rectifying and outputting alternating current amplified by piezoelectric element resonance, or a combination of these schemes.

On the other hand, the switch means 20 is provided on a power charge path for charging the power of the power feed means 10 to the power storing means 40. The control circuit 30 incorporates therein a voltage comparator circuit to compare between a terminal voltage of the switch means 20 on the side of a power feed means 10 output terminal and terminal voltage thereof on the side of the power storing means 40. When this voltage comparator circuit detects that the terminal voltage of the switch means 20 on the power feed means is higher than the terminal voltage on the power storing means 40, the switch means 20 is tuned on to supply the power of the power feed means 10 to the power storing means 40 or the drive circuit 50. In other cases, the switch means 20 is turned off to prevent the power stored on the power storing means 40 from reversely flowing to the power feed means 10. Due to this, it is possible to realize a rectification function by the use of the switch means 20 that has conventionally been realizable only by a diode element. The switch means 20 is lower in voltage drop caused due to passing charge current as compared to that of a diode element, thus eliminating almost all the charge loss due to voltage drop. That is, the use of the switch means 20 instead of a diode element drastically improves charge efficiency. Furthermore, the switch means 20 is extremely low in the reverse current to be caused during off periods, i.e., corresponding to a reverse current through a diode element, as compared to a diode element. That is, there is almost no consumption of useless power in the form of reverse current. Consequently, it is possible to realize further longer time operation for an electronic portable appliance operating on generation power. Because less generation power is required for a same operation time as the conventional, the power generating means can be reduced in size and weight. Due to this, the electronic portable appliance can be reduced in size and weight.

It is noted that, although the switch means 20 may be any of switch elements, the invention recommends the use of a MOS transistor. The MOS transistor, among switch elements, requires less power to turn on and off, and has a feature of a categorically smallest size. Accordingly, the use of a MOS transistor for the switch element 20 enables longer operation and size and weight reduction for the electronic portable appliance.

Incidentally, FIG. 1 shows the case that the switch means 20 utilizes a P channel MOS transistor. As shown in FIG. 1, the P channel MOS transistor has a source and substrate connected to the power storing means 40, a drain connected to the power feed means 10, and a gate connected to receive a control signal from the control circuit 30.

Furthermore, the switch means 20 has a resistance component to provide a voltage drop of approximately 20 mV, due to a current cause when charging the power of the power feed means 10 to the power storing means 40 or when the storage power on the power storing means 40 reversely flows to the power feed means 10. Due to this, even where the voltage comparator circuit of the control circuit 30 has an offset voltage to be encountered as an unavoidable problem with a voltage comparator circuit, the 20 mV voltage drop by the resistance component can absorb such offset voltage. Accordingly, it is possible to prevent oscillation phenomenon, malfunction and so on to be caused due to the relationship between the switch means 20 and the control circuit 30. It is also possible to prevent malfunction in the control circuit 30 to be caused due to erroneous detection resulting from gain insufficiency, which is another unavoidable problem with a voltage comparator circuit of the control circuit 30. That is, because the control circuit 30 stably controls the switch means 20, the switch means 20 can realize an equivalent function to the conventional diode element. Also, the voltage to be compared by the voltage comparator circuit of the control circuit 30 may be taken at any location provided that it is on a charging path at forward and rear points of the switch element 20. Furthermore, the switch element 20 may be at any location on the charge path.

Figure 2:
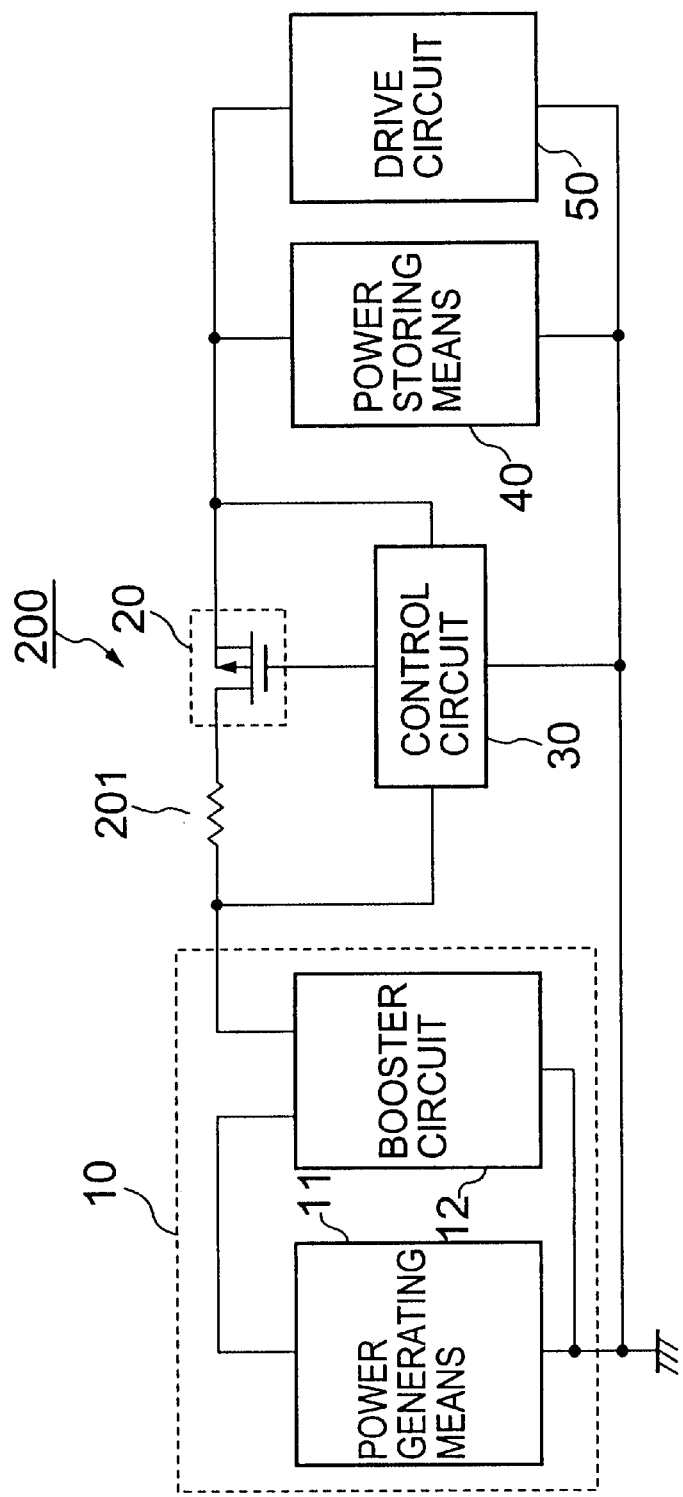
FIG. 2 is a schematic block diagram of an electronic portable appliance showing Embodiment 2 of the present invention.

Referring to FIG. 2, there is shown a schematic block diagram of an electronic portable appliance according to Embodiment 2 of the invention. This is in almost a same structure as the schematic block diagram of the electronic portable appliance of Embodiment 1 shown in FIG. 1. In FIG. 2 an electronic portable appliance 200 to be operated on generation power is different in that a resistor element 201 with the same resistance value as the resistance component of the switch means 20 is provided, in place of the resistance component, in series with the switch means 20 on the charging path in order to reduce the resistance value of the resistance component. Furthermore, in Embodiment 2 of FIG. 2 the points to be compared in voltage by the voltage comparator circuit of the control circuit 30 are taken by a terminal of a resistor element 201 on a power feed means 10 side and a terminal of the switch means 20 on a power storing means 40 side, although they are across the switch means 20 in Embodiment 1 of FIG. 1.

Due to this, a best resistance value can be set for stably operating the control circuit 30 in accordance with the ability of the power feed means 10 by replacing with the resistor element 201, in addition to the effect offered by the electronic portable appliance 100 of Embodiment 1 shown in FIG. 1. Thus, there obtains an effect that time and labor can be omitted in designing a switch means 20 having a best resistance component for stably operating the control circuit 30 in accordance with the ability of the power feed means 10 or searching for a switch means 20 having a close resistance value to a best resistance value.

Incidentally, in FIG. 2 the points to be compared in voltage by the voltage comparator circuit of the control means 30 may be anywhere provided that they are on a charging path at forward and rear points of the resistor element 201 and switch means 20. Furthermore, the resistor element 201 may be anywhere on the charging path. Furthermore, the resistor element 201 and switch means 20 may be anywhere on the charging path.

Figure 3:
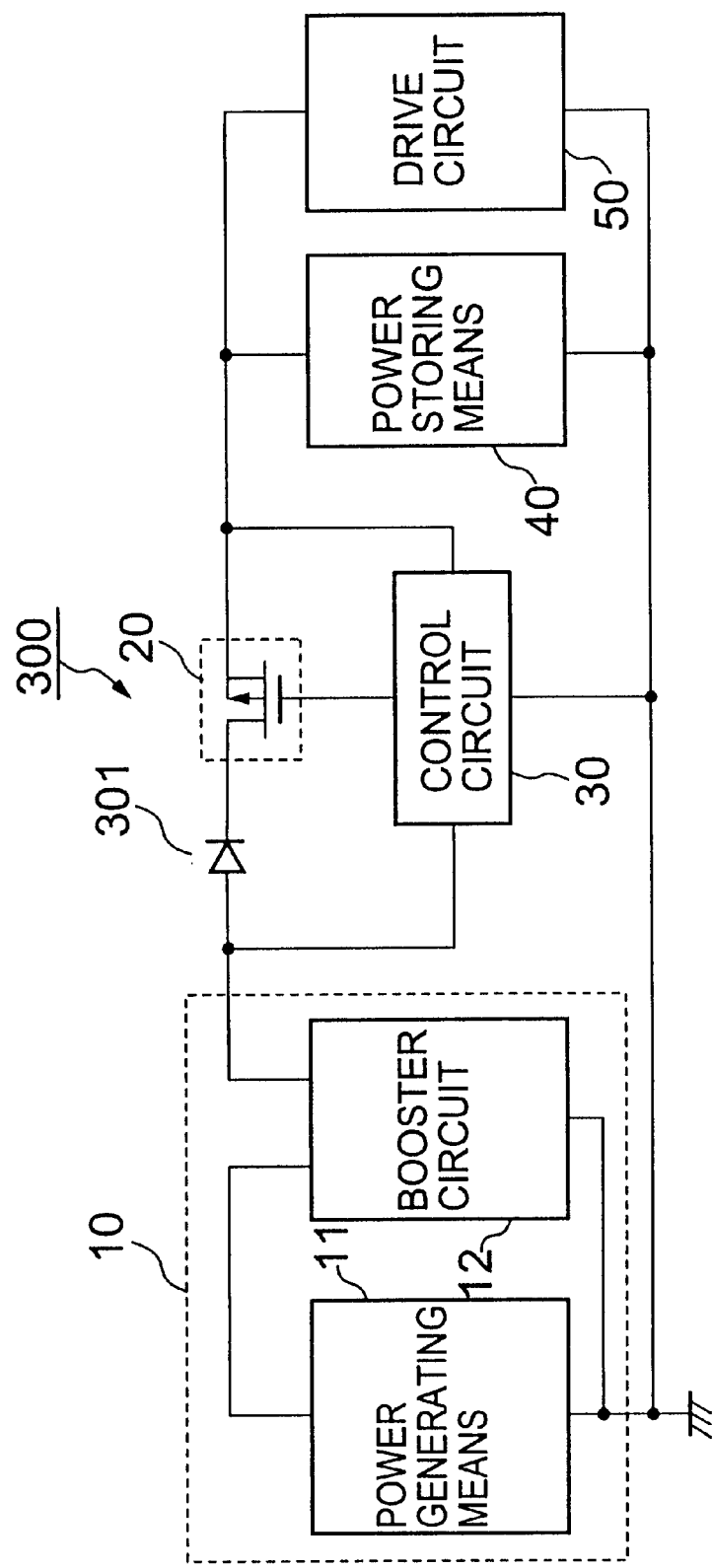
FIG. 3 is a schematic block diagram of an electronic portable appliance showing Embodiment 3 of the present invention.

Referring to FIG. 3, there is shown a schematic block diagram of an electronic portable appliance according to Embodiment 3 of the invention. As shown in FIG. 3, the electronic portable appliance of Embodiment 3 is different from Embodiment 2 of FIG. 2 in that a diode element 301 is provided to replace the resistor element 201 of the electronic portable appliance 200 of Embodiment 2 in FIG. 2. That is, the electronic portable appliance of Embodiment 3 has the diode element 301 connected to provide forward charging from the power feed means 10 to the power storing means 30.

Here, the diode element 301 adopts a diode element having a forward voltage drop by far lower than that of a diode element used in the conventional electronic portable appliance driven on generation power. This can suppress low a voltage drop on a charging path from the power feed means 10 to the power storing means 40 and hence improve charge efficiency, as compared to the conventional electronic portable appliance driven on generation power. Of course, the adoption of the diode element with such low forward voltage drop increases reverse current through the diode element. However, such reverse current when flowing can be put off by the switch means 20. Thus, reverse current can be suppressed by far low.

Furthermore, the diode element 301 has the function of producing a voltage drop to be provided by the resistance component of the switch means 20 of the electronic portable appliance shown in FIG. 1 or by the resistor element 201 of the electronic portable appliance shown in FIG. 2, thereby providing an effect of stably operating the control circuit 30. Furthermore, for high charge current, provided is an effect of improving the charge efficiency. This is because the voltage drop due to a resistance component caused upon passing the resistance component by a charge current linearly increases with increase in the charge current. On the other hand, for low charging current the voltage drop due to a diode element is greater by an amount of a forward voltage drop than a voltage drop due to a resistance component. For high charging current, that voltage drop is lower than a voltage drop due to the resistance component. That is, in the case of high charging current, the utilization of a diode element provides higher charging efficiency than the use of resistance component.

Incidentally, in FIG. 3 the points to be compared of voltage by the voltage comparator circuit of the control means 30 may be anywhere provided that they are positioned on a charging path at forward and rear points of the diode element 301 and switch means 20. Furthermore, the diode element 301 and the switch means 20 may be provided anywhere on the charging path.

Figure 4:
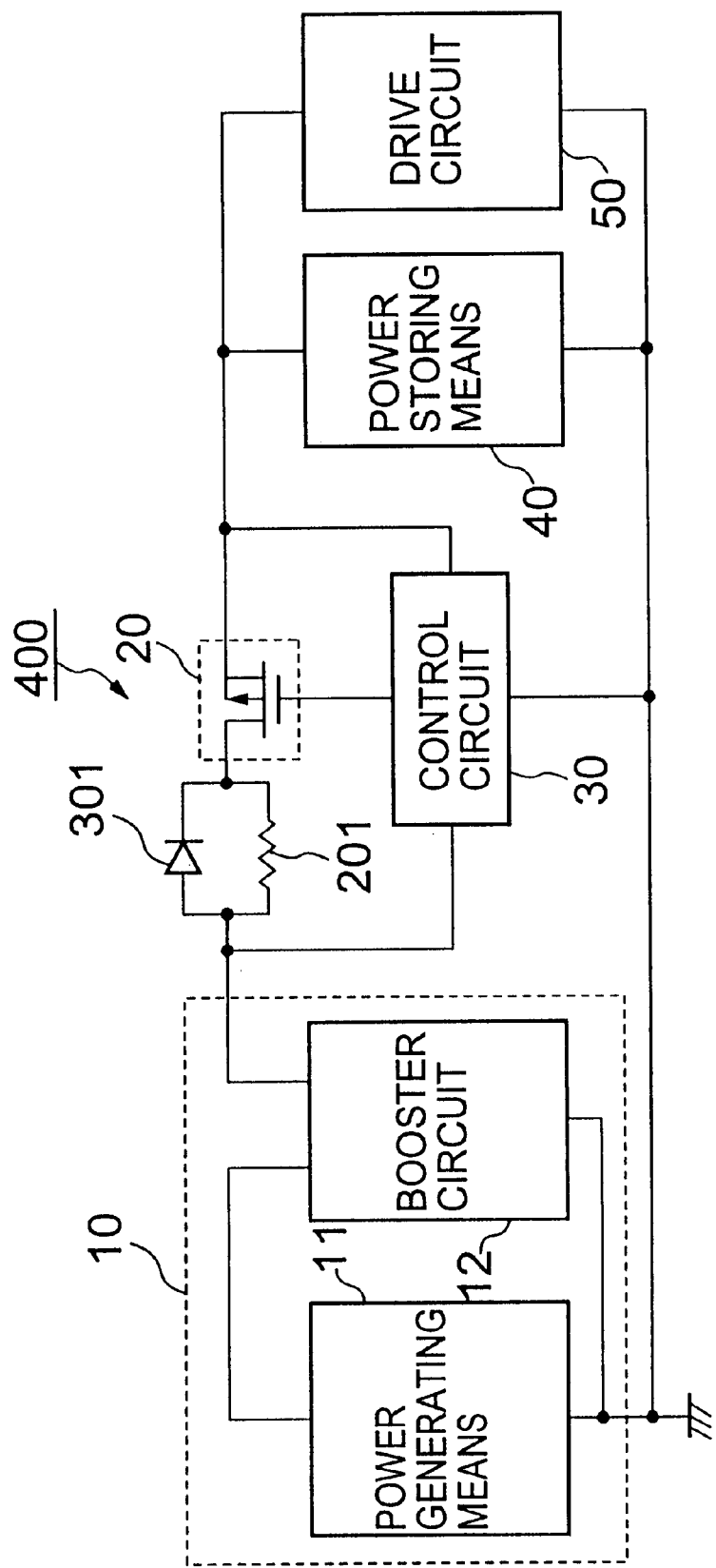
FIG. 4 is a schematic block diagram of an electronic portable appliance showing Embodiment 4 of the present invention.

Referring to FIG. 4, there is shown a schematic block diagram of an electronic portable appliance according to Embodiment 4 of the invention. The structure is almost the same as that of Embodiment 3 shown in FIG. 3. The different point is that a resistor element 201 is provided in parallel with the diode element 301 as shown in FIG. 4.

This structure realizes an electronic portable appliance possessing both the effect given by the structure shown in FIG. 2 and the effect by the structure of FIG. 3. That is, for low charge current nearly all the charge current is supplied through the resistor element 201. For high charge current almost all the charge current is supplied through the diode element 301. Due to this reason, in both the low and high charge current cases, it is possible to decrease the voltage drop upon charging thus offering efficient charging.

Incidentally, in FIG. 4 the points to be compared of voltage by the voltage comparator circuit of the control means 30 may be anywhere provided that they are located on a charging path at forward and rear points of the diode element 301 and resistor element 201 connected in parallel therewith. Furthermore, the diode element 301 and the resistor element 201 connected in parallel therewith or the switch means 20 may be anywhere on the charging path.

Figure 5:
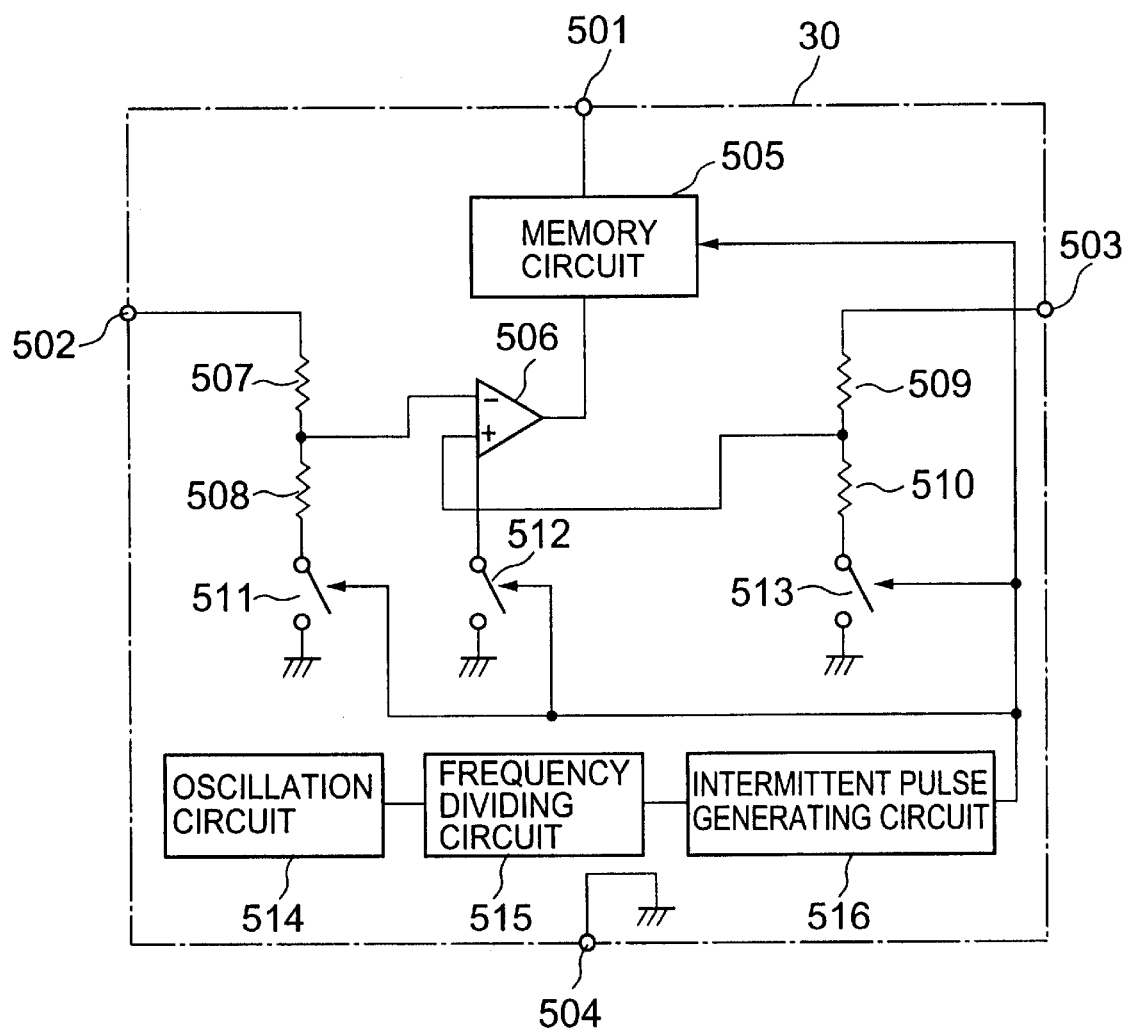
FIG. 5 is a block diagram of a control circuit for the electronic portable appliance of the present invention.
Figure 6:
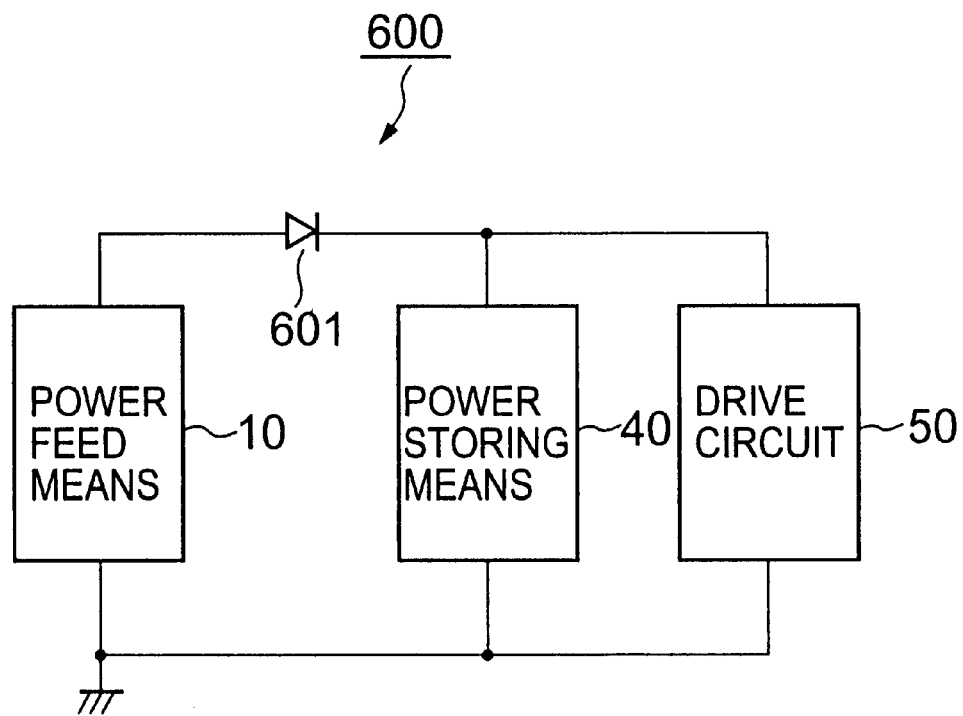
FIG. 6 is a schematic block diagram showing a conventional electronic portable appliance.

Referring to FIG. 5, there is shown a schematic block diagram of a control circuit 30 to be used in the electronic portable appliance for Embodiments 1 to 4 shown in FIG. 1 to FIG. 4. As shown in FIG. 5, a first input terminal 502 is connected to a charging path on a front stage of means for causing a voltage drop due to a charge current or to a charging path on a front stage of a switch means 20. A second input terminal 503 is connected to a charging path on a rear stage of the means for causing a voltage drop due to a charge current or to a charging path on a rear stage of the switch means 20. Furthermore, a GND connection terminal 504 is connected to a GND terminal. Also, a control circuit 30 is provided with an output terminal 501 to output a control signal to turn on and off the switch means.

The input power voltage to the first input terminal 502 is divided by a first bleeder resistor formed by a resistor 507 and a resistor 508. The input power voltage to the second input terminal 503 is divided by a second bleeder resistor formed by a resistor 509 and a resistor 510. A voltage comparator circuit 506 compares a voltage divided by the first bleeder resistor with a voltage divided by a second bleeder resistor, and outputs a comparison result to a memory circuit 505. Furthermore, a switch means 511 is provided between the first bleeder resistor and the GND terminal. A switch means 513 is provided between the second bleeder resistor and the GND terminal. A switch means 512 is provided between the voltage comparator circuit 506 and the GND terminal. Each switch means 511, 512, 513 is intermittently turned on by an intermittent signal outputted by an intermittent pulse generating circuit 516. Also, the memory circuit 505 receives such an intermittent pulse to acknowledge timing of turning on the switch means 511, 512, 513, and rememorize a result of comparison by the voltage comparator circuit 506 each time the switch means 511, 512, 513 turns on. The comparison result memorized by the memory circuit 505 is outputted to the output terminal 501, as a signal to control the switch means 20 shown in FIG. 1 to FIG. 4. Furthermore, the intermittent pulse generating circuit 516 creates an intermittent pulse based on a frequency divided signal divided of a clock signal of an oscillation circuit 514 by the frequency dividing circuit 515. It is noted that here the ratio of the resistor 507 to the resistor 508 is taken the same as the ratio of the resistor 509 to the resistor 510, in order to enhance highest the accuracy of comparison by the voltage comparator circuit 506.

The control circuit 30 configured as above makes possible intermittent operation for the voltage comparator circuit 506 with the first bleeder resistor and second bleeder resistor, hence providing current reduction for the control circuit 30.

Furthermore, where the drive circuit 50 shown in FIG. 1 to FIG. 4 incorporates an oscillation circuit and frequency dividing circuit as in a timepiece IC or a booster circuit 12 is a booster circuit incorporating an oscillation circuit of a switched capacitor scheme or the like, the oscillation circuit 514 and the frequency dividing circuit 515 shown in FIG. 5 are not required. It is satisfactory that the intermittent pulse generating circuit 516 be inputted by a divided clock signal from a timepiece IC or the frequency dividing circuit 515 be inputted by a clock signal of the oscillation circuit provided in the booster circuit. Thus, it is possible to reduce the current to be consumed by the oscillation circuit 514 and frequency dividing circuit 515 or the oscillation circuit 514, hence further reducing current consumption for the control circuit 30.

According to the invention, the electronic portable appliance to be driven on generation power can efficiently charge generation power or increased generation power to the power storing means. Furthermore, it is possible to decrease other consumption than by the drive circuit of power charged on the power storing means, making possible long-time operation of the electronic portable appliance.

Also, for a same operating time of the electronic portable appliance, it is possible to operate over a same time with a reduced amount of generation power. Accordingly, the power generating means or booster circuit can be reduced in size and weight, correspondingly reducing the size and weight of the electronic portable appliance.

Furthermore, according to the invention, where the drive circuit or booster circuit has an oscillation circuit or frequency dividing circuit, it is possible to reduce other consumption than by the drive circuit of power stored on the power storing means, further increasing the operating time of the electronic portable appliance or reducing the size and weight thereof.

What is claimed is:

1. An electronic portable appliance, comprising:
    power feed means for supplying electric power;
    power storing means for storing electric power of the power feed means;
    a drive circuit connected to be driven by one of electric power of the power feed means and electric power stored on the power storing means;
    switch means provided on a charging path to charge power of the power feed means to the power storing means; and
    a control circuit provided to compare voltages on a charging path at forward and rear points of the switch means;
    wherein the control circuit turns on the switch means to charge electric power of the power feed means to the power storing means when detecting higher is a voltage on the charging path at the forward point of the switch means, and turns off the switch means to prevent storage power from reversely flowing from the power storing means to the power feed means when detecting lower is a voltage on the charging path at the forward point of the switch means.

2. An electronic portable appliance, comprising:
    power feed means for supplying electric power;
    power storing means for storing electric power of the power feed means;
    a drive circuit connected to be driven by one of electric power of the power feed means and electric power stored on the power storing means;
    a resistance element provided in series on a charging path to charge electric power of the power feed means to the power storing means;
    switching means provided on the charging path; and a control circuit provided to compare voltages on the charging path at forward and rear points of the resistor element and the switch means;

wherein the control circuit turns on the switch means to charge electric power of the power feed means to the power storing means when detecting higher is a voltage on the charging path at the forward point of the resistor element and the switch means, and turns off the switch means to prevent storage power from reversely flowing from the power storing means to the power feed means when detecting lower is a voltage on the charging path at the forward point of the resistance element and the switch means.

3. An electronic portable appliance, comprising:

power feed means for supplying electric power;

power storing means for storing electric power of the power feed means;

a drive circuit connected to be driven by one of electric power of the power feed means and electric power stored on the power storing means;

a diode element provided in a forward charging direction on a charging path to charge power of the power feed means to the power storing means;

switch means provided in series with the diode element on a charging path; and a control circuit provided to compare voltages on a charging path at forward and rear points of the diode element and the switch means;

wherein the control circuit turns on the switch means to charge electric power of the power feed means to the power storing means when detecting higher is a voltage on the charging path at the forward point of the diode element and the switch means, and turns off the switch means to prevent storage power from reversely flowing from the power storing means to the power feed means when detecting lower is a voltage on the charging path at the forward point of the diode element and the switch means.

4. An electronic portable appliance, comprising:

power feed means for supplying electric power;

power storing means for storing electric power of the power feed means;

a drive circuit connected to be driven by one of electric power of the power feed means and electric power stored on the power storing means;

a diode element provided in a forward charging direction on a charging path to charge power of the power feed means to the power storing means;

a resistor element provided in parallel with the diode element on the charging path;

switch means provided in series with at least one of the diode element and the resistor element on a charging path; and a control circuit provided to compare voltages on a charging path at forward and rear points of the diode element and the resistor element connected in parallel with each other and the switch means;

wherein the control circuit turns on the switch means to charge electric power of the power feed means to the power storing means when detecting higher is a voltage on the charging path at the forward point of the diode element and the resistor element connected in parallel with each other and the switch means, and turns off the switch means to prevent storage power from reversely flowing from the power storing means to the power feed means when detecting lower is a voltage on the charging path at the forward point of the diode means and the resistor element connected in parallel with each other and the switch means.

5. An electronic portable appliance according to claim 1, wherein the switch means is a MOS transistor.

6. An electronic portable appliance according to claim 1, wherein the control circuit has a voltage comparator circuit to operate intermittently and a memory circuit to rememorize a result of comparison by the voltage comparator circuit in operation each time the voltage comparator circuit operates and output the memorized comparison result as a control signal for the switch means.

7. An electronic portable appliance according to claim 6, wherein the drive circuit has an oscillation circuit or an oscillation circuit and frequency dividing circuit, whereby an intermittent pulse is created based on an output signal of one of the oscillation circuit and the frequency dividing circuit to cause the voltage comparator circuit to intermittently operate.

8. An electronic portable appliance according to claim 6, wherein the power feed means has a booster circuit to increase an electromotive force voltage of a power generating means by utilizing output signals of the power generating means and the oscillation circuit, whereby an intermittent pulse is created based on an output signal of the oscillation circuit to cause the voltage comparator circuit of the control circuit to intermittently operate.

9. An electronic portable appliance, comprising: power feed means for supplying electric power, power storing means for storing electric power of the power feed means, a drive circuit connected to be driven by at least one of electric power of the power feed means and electric power stored on the power storing means, switch means provided between the power feed means and the power storing means, and a control circuit for comparing between a voltage of the switch means on a side of the power feed means and a voltage thereof on a side of the power storing means; wherein the control circuit turns on the switch means when the voltage of the switch means on the power feed means side is higher and turns off the switch means when the voltage of the switch means on the power feed means side is lower.

10. An electronic portable appliance according to claim 9, further comprising a resistor element provided between the switch means and the power storing means; and wherein the control circuit turns on the switch means when the voltage of the resistor element on the power feed means side is higher and turns off the switch means when the voltage of the switch means on the power storing means side is higher.

11. An electronic portable appliance according to claim 9, further comprising a diode element provided in a forward charging direction between the switch means and the power storing means; and wherein the control circuit turns on the switch means when the voltage of the diode element on the power feed means side is higher and turns off the switch means when the voltage of the switch means on the power storing means side is higher.

12. An electronic portable appliance according to claim 11, further comprising a resistor element connected in parallel with the diode element.

13. An electronic portable appliance according to claim 9, wherein the switch means has a MOS transistor.

14. An electronic portable appliance according to claim 9, wherein the control circuit has a voltage comparator circuit to operate intermittently and a memory circuit to rememorize a result of comparison by the voltage comparator circuit in operation each time the voltage comparator circuit operates and output the memorized comparison result as a control signal for the switch means.

15. An electronic portable appliance according to claim 14, wherein the drive circuit has at least one of an oscillation circuit and a frequency dividing circuit, whereby an intermittent pulse is created based on an output signal at least one of the oscillation circuit and the frequency dividing circuit to cause the voltage comparator circuit to intermittently operate.

16. An electronic portable appliance according to claim 14, wherein the power feed means has a booster circuit to increase an electromotive force voltage of a power generating means by utilizing output signals of the power generating means and the oscillation circuit, whereby an intermittent pulse is created based on an output signal of the oscillator circuit to cause the voltage comparator circuit of the control circuit to intermittently operate.

17. An electronic portable appliance according to claim 2, wherein the control circuit has a voltage comparator circuit to operate intermittently and a memory circuit to rememorize a result of comparison by the voltage comparator circuit in operation each time the voltage comparator circuit operates and output the memorized comparison result as a control signal for the switch means.

18. An electronic portable appliance according to claim 3, wherein the control circuit has a voltage comparator circuit to operate intermittently and a memory circuit to rememorize a result of comparison by the voltage comparator circuit in operation each time the voltage comparator circuit operates and output the memorized comparison result as a control signal for the switch means.

19. An electronic portable appliance according to claim 4, wherein the control circuit has a voltage comparator circuit to operate intermittently and a memory circuit to rememorize a result of comparison by the voltage comparator circuit in operation each time the voltage comparator circuit operates and output the memorized comparison result as a control signal for the switch means.

20. An electronic portable appliance according to claim 17, wherein the drive circuit has an oscillation circuit, whereby an intermittent pulse is created based on an output signal of the oscillation circuit to cause the voltage comparator circuit to intermittently operate.

* * * * *

US006362611C1

(12) EX PARTE REEXAMINATION CERTIFICATE (5718th)
United States Patent
Utsunomiya

(10) Number: US 6,362,611 C1
(45) Certificate Issued: Mar. 20, 2007

(54) ELECTRONIC PORTABLE APPLIANCE

(75) Inventor: Fumiyasu Utsunomiya, Chiba (JP)

(73) Assignee: Seiko Instruments Inc., Chiba (JP)

Reexamination Request:
No. 90/006,973, Mar. 22, 2004

Reexamination Certificate for:
Patent No.: 6,362,611
Issued: Mar. 26, 2002
Appl. No.: 09/421,595
Filed: Oct. 20, 1999

(30) Foreign Application Priority Data
Oct. 22, 1998 (JP) ........................................ 10-301023

(51) Int. Cl.
*G05F 1/40* (2006.01)

(52) U.S. Cl. ....................................................... 323/282
(58) Field of Classification Search ...................... None
See application file for complete search history.

(56) References Cited

U.S. PATENT DOCUMENTS

| 4,291,266 A | | 9/1981 | Portmann |
| 5,420,497 A | | 5/1995 | Kimura et al. |
| 5,438,225 A | | 8/1995 | Berger |
| 6,407,571 B1 | * | 6/2002 | Furuya et al. ............... 324/765 |
| 6,961,914 B1 | * | 11/2005 | Teig et al. ..................... 716/5 |

FOREIGN PATENT DOCUMENTS

| JP | 11-106253 | * | 4/1999 |
| JP | 10-323824 | * | 11/1999 |

OTHER PUBLICATIONS

"The IEEE Standard Dictionary of Electrical and Electronics Terms" Sixth Edition Published by IEEE, Inc. in 1997, pp. 916–917.*
Translation of JP 10–323824.*

* cited by examiner

*Primary Examiner*—Margaret Rubin

(57) ABSTRACT

An electronic portable appliance is provided which can operate over a long time by enhancing charging efficiency of the electronic portable appliance driven on generation power and reducing useless current consumed by those other than a drive circuit, or can operate over an equivalent drive time to the conventional even where feed power is reduced by reducing the size and weight of a power feed means configured by a power generating means, booster circuit, etc. in order to reduce the size and weight of the electronic portable appliance. The electronic portable appliance is configured by a power feed means to supply power, a power storing means to store the power of the power feed means, a drive circuit to drive on power stored on the power of the power feed means or power stored on the power storing means, a switch means provided on a charge path to charge the power of the power feed means to the power storing means, and a control circuit for comparing between voltages on the charging path at a forward and rear of the switch means to turn on the switch means to charge the power of the power feed means to the power storing means when detecting that the voltage at the forward of the switch means on the charging path is higher and to turn off the switch means to prevent the stored power from reversely flowing from the power storing means to the power feed means when detecting that the voltage at the forward of the switch means on the charging path is lower.

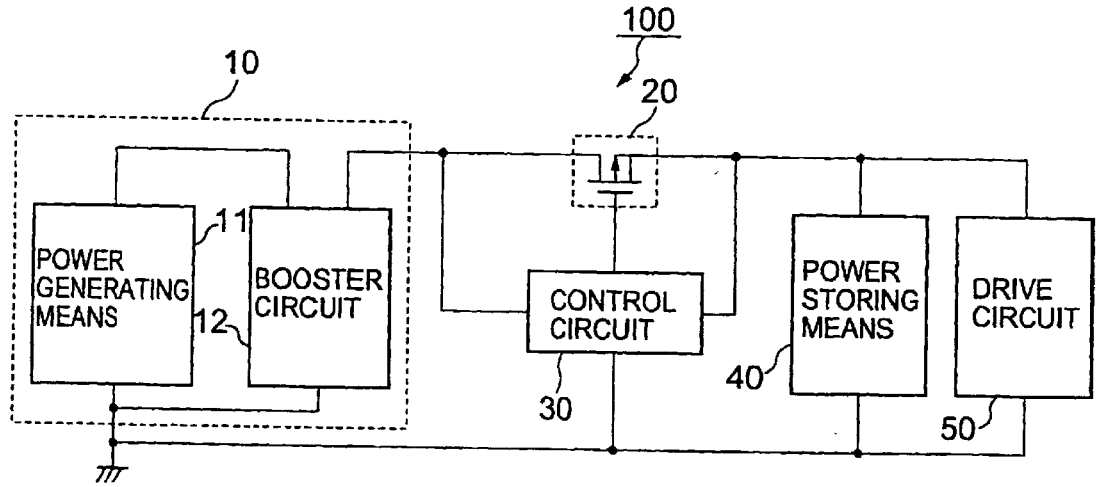

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4 and 19 is confirmed.

Claims 1–3 and 9 are determined to be patentable as amended.

Claims 5–8, 10–18 and 20, dependent on an amended claim, are determined to be patentable.

1. An electronic portable appliance, comprising:
   power feed means for supplying electric power;
   power storing means for storing electric power of the power feed means;
   a drive circuit connected to be driven by one of electric power of the power feed means and electric power stored on the power storing means;
   switch means provided on a charging path to charge power of the power feed means to the power storing means; and
   a control circuit provided to *intermittently* compare voltages on a charging path at forward and rear points of the switch means;
   wherein the control circuit turns on the switch means to charge electric power of the power feed means to the power storing means when [detecting higher is] a *higher* voltage *is detected* on the charging path at the forward point of the switch means *than at the rear point*, and turns off the switch means to prevent storage power from reversely flowing from the power storing means to the power feed means when [detecting lower is] a *lower* voltage *is detected* on the charging path at the forward point of the switch means *than at the rear point, and the switch means maintains an existing switching state when the control circuit is not being driven to compare the voltages on the charging path at forward and rear points of the switch means.*

2. An electronic portable appliance, comprising:
   power feed means for supplying electric power;
   power storing means for storing electric power of the power feed means;
   a drive circuit connected to be driven by one of electric power of the power feed means and electric power stored on the power storing means;
   a [resistance] *resistor* element provided in series on a charging path to charge electric power of the power feed means to the power storing means;
   [switching] *switch* means provided on the charging path *to charge power of the power feed means to the power storing means*; and
   a control circuit provided to compare voltages on the charging path at forward and rear points of the resistor element and the switch means;
   wherein the control circuit turns on the switch means to charge electric power of the power feed means to the power storing means when [detecting higher is] a *higher* voltage *is detected* on the charging path at the forward point of the resistor element and the switch means *than at the rear point*, and turns off the switch means to prevent storage power from reversely flowing from the power storing means to the power feed means when [detecting lower is] a *lower* voltage *is detected* on the charging path at the forward point of the [resistance] *resistor* element and the switch means *than at the rear point, and the switch means maintains an existing switching state when the control circuit is not being driven to compare the voltages on the charging path at forward and rear points of the resistor element and the switch means.*

3. An electronic portable appliance, comprising:
   power feed means for supplying electric power;
   power storing means for storing electric power of the power feed means;
   a drive circuit connected to be driven by one of electric power of the power feed means and electric power stored on the power storing means;
   a diode element provided in a forward charging direction on a charging path to charge power of the power feed means to the power storing means;
   switch means provided in series with the diode element on a charging path *to charge power of the power feed means to the power storing means*; and
   a control circuit provided to compare voltages on a charging path at forward and rear points of the diode element and the switch means;
   wherein the control circuit turns on the switch means to charge electric power of the power feed means to the power storing means when [detecting higher is] a *higher* voltage *is detected* on the charging path at the forward point of the diode element and the switch means *than at the rear point*, and turns off the switch means to prevent storage power from reversely flowing from the power storing means to the power feed means when [detecting lower is] a *lower* voltage *is detected* on the charging path at the forward point of the diode element and the switch means *than at the rear point, and the switch means maintains an existing switching state when the control circuit is not being driven to compare the voltages on the charging path at forward and rear points of the diode element and the switch means.*

9. An electronic portable appliance, comprising: power feed means for supplying electric power, power storing means for storing electric power of the power feed means, a drive circuit connected to be driven by at least one of electric power of the power feed means and electric power stored on the power storing means, switch means provided between the power feed means and the power storing means, and a control circuit for *intermittently* comparing between a voltage of the switch means on a side of the power feed means and a voltage thereof on a side of the power storing means; wherein the control circuit turns on the switch means when the voltage of the switch means on the power feed means side is higher and turns off the switch means when the voltage of the switch means on the power feed means side is lower, *and the switch means maintains an existing switching state when the control circuit is not being driven to compare voltages of the switch means on the side of the power feed means and the side of the power storing means.*

\* \* \* \* \*